(12) United States Patent
Ji et al.

(10) Patent No.: US 7,436,958 B2
(45) Date of Patent: Oct. 14, 2008

(54) METHOD OF DISTRIBUTED IPMP DEVICE MESSAGING AND CARRIAGE OF RIGHTS IN MPEG IPMP CONTENT

(75) Inventors: Ming Ji, Singapore (SG); Sheng Mei Shen, Singapore (SG); Zhongyang Huang, Singapore (SG); Takanori Senoh, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 465 days.

(21) Appl. No.: 10/502,644

(22) PCT Filed: Feb. 4, 2003

(86) PCT No.: PCT/JP03/01097

§ 371 (c)(1),
(2), (4) Date: Apr. 11, 2005

(87) PCT Pub. No.: WO03/067819

PCT Pub. Date: Aug. 14, 2003

(65) Prior Publication Data

US 2005/0204067 A1    Sep. 15, 2005

Related U.S. Application Data

(60) Provisional application No. 60/353,984, filed on Feb. 5, 2002.

(51) Int. Cl.
H04M 1/66     (2006.01)
H04M 1/68     (2006.01)
H04M 3/16     (2006.01)

(52) U.S. Cl. .................... 380/200; 380/201; 455/410; 705/51; 713/168

(58) Field of Classification Search .................. 370/312, 370/432, 441, 442; 455/410–411, 466; 713/150–182; 380/200–203; 705/51–58
See application file for complete search history.

(56) References Cited

U.S. PATENT DOCUMENTS 5,920,861 A    7/1999    Hall et al.

(Continued)

FOREIGN PATENT DOCUMENTS

CN    1249041    3/2000

(Continued)

OTHER PUBLICATIONS

DVB: "Call for Proposals for Content Protection & Copy Management Technologies", Jul. 5, 2001, downloaded from http://www.cptwg.org/Assets/DVB-CPT-CfP_rev1.2.PDF.

(Continued)

*Primary Examiner*—Simon D Nguyen
(74) *Attorney, Agent, or Firm*—Greenblum & Bernstein, P.L.C.

(57) ABSTRACT

The present invention relates to content and IPMP tool transfer among distributed IPMP devices. A set of messages is defined for distributed IPMP devices. These messages include content transfer message, IPMP tool transfer messages, as well device ID broadcasting messages. Using these messages, distributed devices can use a standard set of messages to establish a network, and exchange content protected by IPMP in an inter-operable way. It is also related to carriage of rights in MPEG system, especially in MPEG-4 system. Rights ES (Elementary Stream) is defined in MPEG-4 system, to carry rights information. The Rights ES is also attached with information including whether the rights carried in the ES is proprietary or not, and/or what should be the rights management tool to handle this Rights ES. With that, terminal can be built in an inter-operable way, and retrieve rights from a standardized position.

5 Claims, 4 Drawing Sheets

U.S. PATENT DOCUMENTS

| | | | |
|---|---|---|---|
| 6,138,119 A | 10/2000 | Hall et al. | |
| 6,697,944 B1 * | 2/2004 | Jones et al. | 713/168 |
| 7,016,498 B2 * | 3/2006 | Peinado et al. | 380/277 |
| 7,062,500 B1 | 6/2006 | Hall et al. | |
| 7,099,491 B2 * | 8/2006 | Takaku | 382/100 |
| 7,233,948 B1 * | 6/2007 | Shamoon et al. | 707/9 |
| 2001/0023458 A1 | 9/2001 | Gavoille | |
| 2002/0002468 A1 | 1/2002 | Spagna et al. | |
| 2002/0035725 A1 * | 3/2002 | Ando | 725/32 |
| 2002/0107803 A1 | 8/2002 | Lisanke et al. | |
| 2003/0046238 A1 * | 3/2003 | Nonaka et al. | 705/51 |
| 2003/0061481 A1 * | 3/2003 | Levine et al. | 713/163 |
| 2004/0093337 A1 | 5/2004 | Shen et al. | |
| 2005/0131832 A1 | 6/2005 | Fransdonk | 705/59 |
| 2005/0216731 A1 * | 9/2005 | Saito et al. | 713/153 |
| 2006/0053158 A1 | 3/2006 | Hall et al. | |
| 2007/0030974 A1 * | 2/2007 | Ishibashi et al. | 380/281 |
| 2007/0277031 A1 * | 11/2007 | Ginter et al. | 713/155 |

FOREIGN PATENT DOCUMENTS

| | | |
|---|---|---|
| JP | 2003-199063 | 7/2003 |
| WO | 98/37481 | 8/1998 |
| WO | 99/48296 | 9/1999 |
| WO | 03/015416 | 2/2003 |
| WO | 03/039155 | 5/2003 |

OTHER PUBLICATIONS

S. Alexander et al., "DHCP Options and BOOTP Vendor Extensions", IETF Request for Comments, Mar. 13, 2001, pp. 1-34.

"MPEG-4 Intellectual Property Management & Protection (IPMP) Overview & Applications Document", International Organization for Standardization—Organisation Internationale de Normalisation, Dec. 1998, pp. 1-8.

ISO/IEC JTC 1/SC 29/WG11 N4269: "Coding of Moving Pictures and Audio", ICO/IEC JTC1/SC29/WG11 N4269, Jul. 2001, pp. 1-38.

ISO/IEC JTC1/SC29/WG11 N3943: "Intellectual Property Management and Protection in MPEG Standards", ISO/IEC JTC, Jan. 2001, downloaded from http://www.cselt.it/mpeg/standards/ipmp/.

English Language Abstract of JP 2003-199063.

* cited by examiner

METHOD OF DISTRIBUTED IPMP DEVICE MESSAGING AND CARRIAGE OF RIGHTS IN MPEG IPMP CONTENT

CROSS-REFERENCE TO RELATED APPLICATION

This application claims the benefit of U.S. Provisional Application No. 60/353,984, filed Feb. 5, 2002.

TECHNICAL FIELD

The present invention relates to content and Intellectual Property Management and Protection (hereinafter referred to as IPMP) tool transfer among distributed IPMP devices.

It is also related to carriage of rights in Motion Picture Expert Group (MPEG) system, especially in MPEG-4 system.

BACKGROUND ART

As broadband network reaches to every home, content distribution is becoming more and more demanding. User is happy with the convenience, and they can enjoy entertainment more easily and efficiently than before.

In a content distribution chain, there are many parties involved in the operation of one content, from content owner, content distributor, to end-user.

First of all, content owner creates contents and postproduction house helps them to encode into certain formats like MPEG-2 or MPEG-4. The content is also protected in an IPMP way, for example, encrypted by certain IPMP tool.

In order to identify, protect and recognise each content, content owner will create usage rules to describe rights for different pieces of content. When content is requested or distributed to user, different usage rules will be applied to different cases based on different business model or strategy. Such usage rules or rights description will be much different from one content distributor to another even for the same content owner.

Traditional IPMP or condition access (hereinafter referred to as CA) system only protects content from content distributor up to the entry point of end-user's home network, for example set-top box (hereinafter referred to as STB) in the case of Digital Video Broadcasting. The prior art of IPMP protection of content is illustrated in FIG. 1.

There is currently no standardized or interoperable way to protect content after content has been retrieved, in particular, content transfer or consumption among devices. There is also no standardized or interoperable way to exchange content or IPMP tool among devices.

Even content is encoded in the same format, like MPEG-4, but it still cannot achieve interoperability due to the different rights description, different usage rules or different places of rights information inside the content.

There is a need to have a standardized way to protect content after content has been retrieved, in particular, content transfer or consumption among devices. We can then have inter-operability among IPMP devices. Hence, there is a need to standardize the way to exchange content or IPMP tool among devices.

There is also a need to standardize a specific place to put rights information (rights description, usage rules) inside an MPEG system, in particular MPEG-4 system.

DISCLOSURE OF INVENTION

A set of messages is defined for distributed IPMP devices. These messages include content transfer message, IPMP tool transfer messages, as well device ID broadcasting messages. Using these messages, distributed devices can use a standard set of messages to establish a network, and exchange content protected by IPMP in an inter-operable way.

A standardized position to hold rights need to be specified for each MPEG system. Rights ES (Elementary Stream) is defined in MPEG-4 system, to carry rights information. The Rights ES is also attached with information including whether the rights carried in the ES is proprietary or not, and/or what should be the rights management tool to handle this Rights ES. With that, terminal can be built in an inter-operable way, and retrieve rights from a standardized position.

(a) Distributed IPMP Devices.

Transmission between two compliant IPMP devices is realized through a standardized interface using messages defined in this invention to provide interoperability, as shown in FIG. 2.

An IPMP device that supports both the traditional IPMP protection and the ability of talking among distributed IPMP devices is shown in FIG. 3.

A set of standard messages are specified in the embodiment to exchange content or IPMP tools to ensure inter-operability among different IPMP devices.

Before any of the above transferring, Mutual Authentication will be performed between two devices. And the messages exchanged among devices maybe set as payload of secure messages to ensure confidentiality.

(b) Carriage of Rights in the Content

On the content production side, a media content is encoded using existing coding technology like MPEG-2 or MPEG-4, and encrypted using existing IPMP tools like DES or AES. The associated rights information is constructed using either standard rights language or proprietary language, and put in a standardized position inside the content.

In MPEG-4 system, the rights information is carried inside a rights ES (Elementary Stream), and multiplexed together with other MPEG-4 system ES. The rights information carried inside the Rights ES maybe digitally signed depending on the content author.

If the rights language used is proprietary, then in the associated decoder specific information, a particular rights management tool is indicated, so that the terminal can transfer the rights information to the specified rights management tool.

On a terminal side, the IPMP terminal retrieves the rights information from the standardized position inside the content, that is, the right ES in the case of MPEG-4 IPMP system.

From the associated rights ES's decoder specific information, if the rights information is coded in a standard rights language that the IPMP terminal also conforms to, the IPMP terminal delivers the rights information to the built-in standard rights management tool. If the rights information is coded in a proprietary rights language, the IPMP terminal routes the rights information to the proprietary rights management tool as indicated by the tool ID.

Finally, all the MPEG-n IPMP terminal built conforming to IPMP standard will be able to retrieve and process rights information carried inside the IPMP protected content in an interoperable way.

BRIEF DESCRIPTION OF DRAWINGS

The present invention will become readily understood from the following description of preferred embodiments thereof made with reference to the accompanying drawings, in which like parts are designated by like reference numeral and in which.

Figure 1:
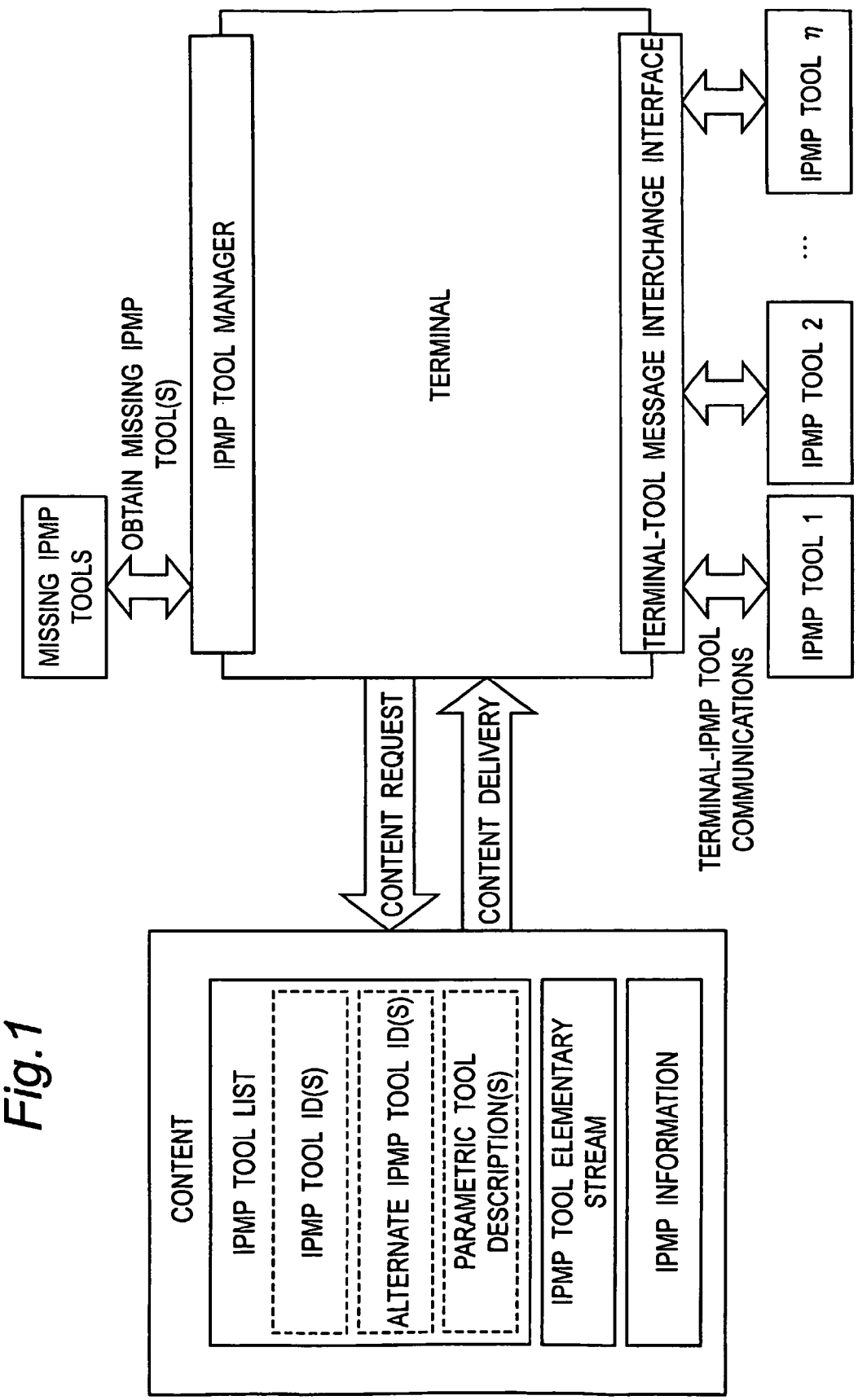
FIG. 1 shows the prior art of traditional IPMP content protection that only protects content from content distribution to entry point device.
Figure 2:
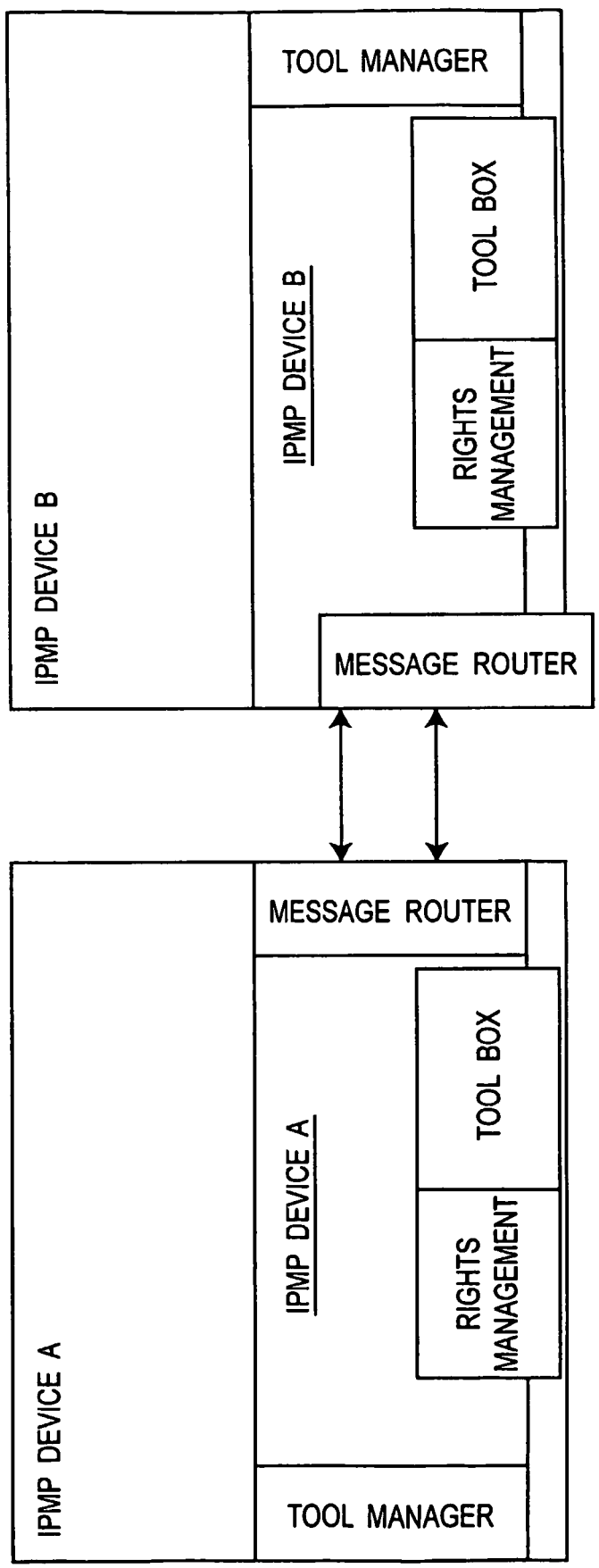
FIG. 2 shows the architecture of messages among distributed IPMP devices.
Figure 3:
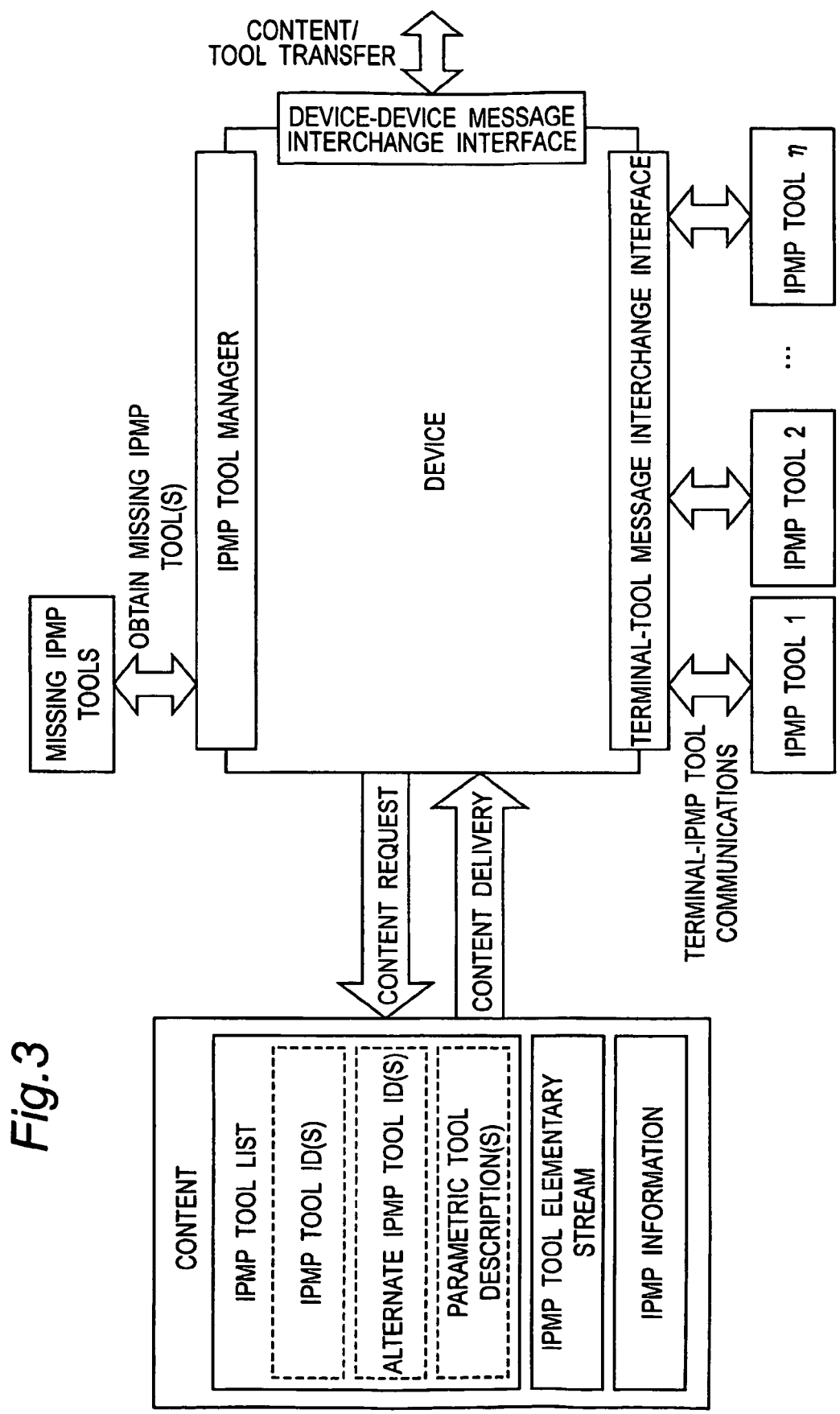
FIG. 3 shows the new architecture of an IPMP device that has the ability of talking to distributed IPMP devices.

BEST MODE FOR CARRYING OUT THE INVENTION (a) Messages Among Distributed IPMP Devices.

(a-1) Addressing of Distributed Devices

To address different IPMP devices in a network domain, every IPMP device should be assigned with a unique 64 bit device ID. How the device ID is assigned and maintained unique is an implementation issue. It may be assigned during the manufacturing time.

(a-2) IPMP_DeviceMessageBase

Syntax
abstract class IPMP_DeviceMessageBase Extends ExpandableBaseClass:

```
bit(8) tag = 0
{
    bit(8) Version;
    bit(64) sender_deviceID;
    bit(64) recipient_deviceID;
    bit(32) Msg_ID;
}
```

Semantics

IPMP_DeviceMessageBase is an expandable base class for IPMP Device to Device Messages. The binary form of the message looks as follows.

| MSG TYPE | EXPANDABLE SIZE | VER | SENDER_Device ID | RECIPIENT_Device ID | MSG ID | MSG TYPE-SPECIFIC DATA |
|---|---|---|---|---|---|---|

Version indicates the version of syntax used in the messages and shall be set to 0x01.
Sender_DeviceID indicates the device ID of the originator of the message.
Recipient_DeviceID indicates the device ID of the intended recipient of the message.
Msg_ID is a message identifier specified by the message originator. All messages sent in response to a message shall include the identifier of the original message.
Some messages extended from IPMP_ToolMessageBase can be extended from IPMP_DeviceMessageBase as well, including IPMP_Tool_Secure_Message, IPMP_InitAuthentication as well as IPMP_MutualAuthentication.

On top of that, there are some specific Device to Device messages, that are defined below.

(a-3) IPMP_DeviceID_Broadcasting Message

Syntax:
class IPMP_DeviceID_Broadcasting extends IPMP_DeviceMessageBase:

```
bit(8) tag = IPMP_DeviceID_Broadcasting_tag
{
    bit(64)      device_ID;
    bit(32)      IPMP_DomainID;
    ByteArray OpaqueData[ ];
}
```

Response:
IPMP_DeviceID_Received.

(a-4) IPMP_DeviceID_Received

When device A received the IPMP_DeviceID_Broadcasting Message from device B, device A needs to send back an acknowledgement message, and tell device B about device A's device ID. The message syntax is shown below.

Syntax:
class IPMP_DeviceID_Received extends IPMP_DeviceMessageBase:

```
bit(8) tag = IPMP_DeviceID_Received_tag
{
    bit(64)      device_ID;
    bit(32)      IPMP_DomainID;
    ByteArray OpaqueData[ ];
}
```

Response:

None.

There are also some content transfer messages as defined below.

(a-5) IPMP_RequestContent

Syntax:
class IPMP_RequestContent Extends IPMP_ToolMessageBase:

```
bit(8) tag = IPMP_RequestContent_tag
{
    bit(128)     ContentID;
    bit(16)      ProgramNumber;
    bit(32)      IPMP_DomainID;
}
```

Semantics:
Content_ID—An identification number that uniquely identifies a recorded content. This Content_ID may possible be assigned by user before the time of recording.

Domain_ID—it identifies the authorized domain. Every IPMP compatible device within the same authorized domain should obtain the same Domain_ID via some secure means from the operator, possible during the time of registration to the operator.

Response:
IPMP_ResponseToContentRequest.
After device A receives the request message from device B. Device A may choose to do a mutual authentication with device B.

(a-6) IPMP_ResponseToContentRequest

Syntax:
class IPMP_ResponseToContentRequest Extends IPMP_ToolMessageBase:

```
    bit(8) tag = IPMP_ResponseToContentRequest_tag
{
    bit(2) response;
    bit(6) reserved=0b111111;
}
```

Semantics:
Table—Response Message for Content Request

| response | Note |
| --- | --- |
| 00 | You are not in authorized domain |
| 01 | No Such content |
| 10 | Prohibit in Copy/Move |
| 11 | Approved |

(a-7) IPMP_ContentTransfer

Syntax:
class IPMP_ContentTransfer Extends IPMP_ToolMessageBase:

```
    bit(8) tag = IPMP_ContentTransfer_tag
{
    bit(128)        ContentID;
    bit(16)         ProgramNumber;
    bit(8)          Sequence;
    bit(32)         PayloadSize;
    bit(8)          Payload[PayloadSize];
}
```

Semantics:
Sequence—an 8 bit field indicates the sequence number of this payload, this enables the recipient device to re-form the content without messing up the content. It accumulates upon each IPMP_ContentTransfer message, and it is reset to 0 when it reaches 256.
To securely transfer the content, this entire message could be set as a payload of the IPMP_Tool_Secure_Message as defined in the currently IPMP Extension CD.

Response:
Not required
Similarly, there are also some tool transfer messages defined below.

(a-8) IPMP_RequestTool

Syntax:
class IPMP_RequestTool Extends IPMP_ToolMessageBase:

```
    bit(8) tag = IPMP_RequestTool_tag
{
    bit(128) ToolID;
    bit(32)         IPMP_DomainID;
}
```

Response:
IPMP_ResponseToToolRequest.
(a-9) IPMP_ResponseToToolRequest

Syntax:
class IPMP_ResponseToToolRequest Extends IPMP_ToolMessageBase:

```
    bit(8) tag = IPMP_ResponseToToolRequest_tag
{
    bit(128) ToolID;
    bit(2) response;
    bit(6) reserved;
    if (response==0b11)
    {
    bit(32)         PayloadSize;
    bit(8) Payload[PayloadSize];
    bit(16)         ToolDescriptionSize;
    bit(8) ToolDescription [ToolDescriptionSize];
    }
}
```

Semantics:
Table—Response Message for Tool Request

| response | Note |
| --- | --- |
| 00 | You are not in authorized domain |
| 01 | No Such tool |
| 10 | Prohibit for transferring |
| 11 | Approved |

Payload—Carries the binary tool.
ToolDescription—description of the binary tool, including whether this tool is permitted to transfer to other devices.
To securely transfer the tool, this entire message could be set as a payload of the IPMP_Tool_Secure_Message as defined in the currently IPMP Extension CD.

Response:
Not required
  (b) Rights ES in MPEG-4 System
  (b-1) Overview of IPMP Rights
  Generally, there are two ways to deliver rights information associated with a certain content.
  Firstly, to deliver the rights out of band, the rights information is packaged into the form of a ticket or a voucher. The ticket usually includes detailed rights for the content using a certain rights language. Descramble key may also be carried in the ticket. A sort of content ID is also included in the ticket, so that the voucher and ticket can be uniquely and unambiguously linked with a certain content.
  This way of rights delivery is an implementation issue, and MPEG does not need to standardize it.
  Secondly, the rights information is carried inside the content, in this way, content and rights information are tightly bounded together. MPEG-4 IPMP Extension needs to standardize the way for the right information to be carried in the content. Rights ES is a new stream to be included in MPEG4 system to carry rights information.

(b-2) IPMP Rights ES

A new streamType "IPMPRightsStream" is defined to carry IPMP Rights Information associated with this content. The value assigned to this streamType can be set as 0x0B, from the currently ISO-reserved range. The modified streamType table would be as below. The objectType for this streamType should always be set to 0xFE. A new tag for this stream type in the MP4 File Format specification will be required.

| streamType value | streamType description |
| --- | --- |
| 0x00 | Forbidden |
| 0x01 | ObjectDescriptorStream |
| 0x02 | ClockReferenceStream |
| 0x03 | SceneDescriptionStream |
| 0x04 | VisualStream |
| 0x05 | AudioStream |
| 0x06 | MPEG7Stream |
| 0x07 | IPMPStream |
| 0x08 | ObjectContentInfoStream |
| 0x09 | MPEGJStream |
| 0x0A | IPMPToolStream |
| 0x0B | IPMPRightsStream |
| 0x0C-0x1F | reserved for ISO use |
| 0x20-0x3F | user private |

The IPMP rights associated with the present content constructed in a certain rights expression language is carried as the payload of one IPMP Rights Stream. The language format, and IPMP Tool ID of the Rights Management Tool who is supposed to parse the rights language is specified in DecoderConfigDescriptor in the associated ESD.

Decoder Specific Information
class IPMPRightsES_DecoderConfig extends DecoderSpecificInfo: bit(8) tag=DecSpecificInfoTag

```
{
    bit(1)      isProprietary;
    bit(7)      reserved = 0b1111111;
    if (isProprietary)
    {
        bit(128)    rights_Tool_ID;
    }
}
```

IsProprietary—A bit field, if true, it means the usage rules carried in the corresponding rights ES are proprietary, and it has to be sent to a proprietary rights management tool in order to parse and understand it. If the bit is false, it indicates that the rights carried are of standard format, and can be passed to standard rights management tool for further processing.

rights_tool_ID—The Tool ID of the proprietary rights management tool. The following usage rules will be sent to this referred rights management tool.

```
BitStream
class IPMP_RightsES
{
    bit(1) isSigned;
    bit(7) reserved = 0b1111111;
```

```
    if (isSigned)
    {
        ByteArray IPMP_Rights_Signature;
        int(16) numCerts;
        int i;
        for(i=0; i<numCerts; i++)
        {
            int( 8) CertType;
            ByteArray Certificate[numCerts];
        }
        bit(128) Verifying_Tool_Id;
    }
    ByteArray       rights;
}
``` isSigned—Indicates the presence of a signature in the rights stream.

IPMP_Righs_Signature—the signature of the data being delivered in the rights stream.

CertType—The type of certification mechanism being used.

NumCerts—The number of certificates included.

Certificate—The array of certificates.

Verifying_Tool_Id—The ID of the Tool that is required to verify the certificate(s).

This may be the ID of the Terminal.

The Rights ES simply carries the rights information.

Figure 4:
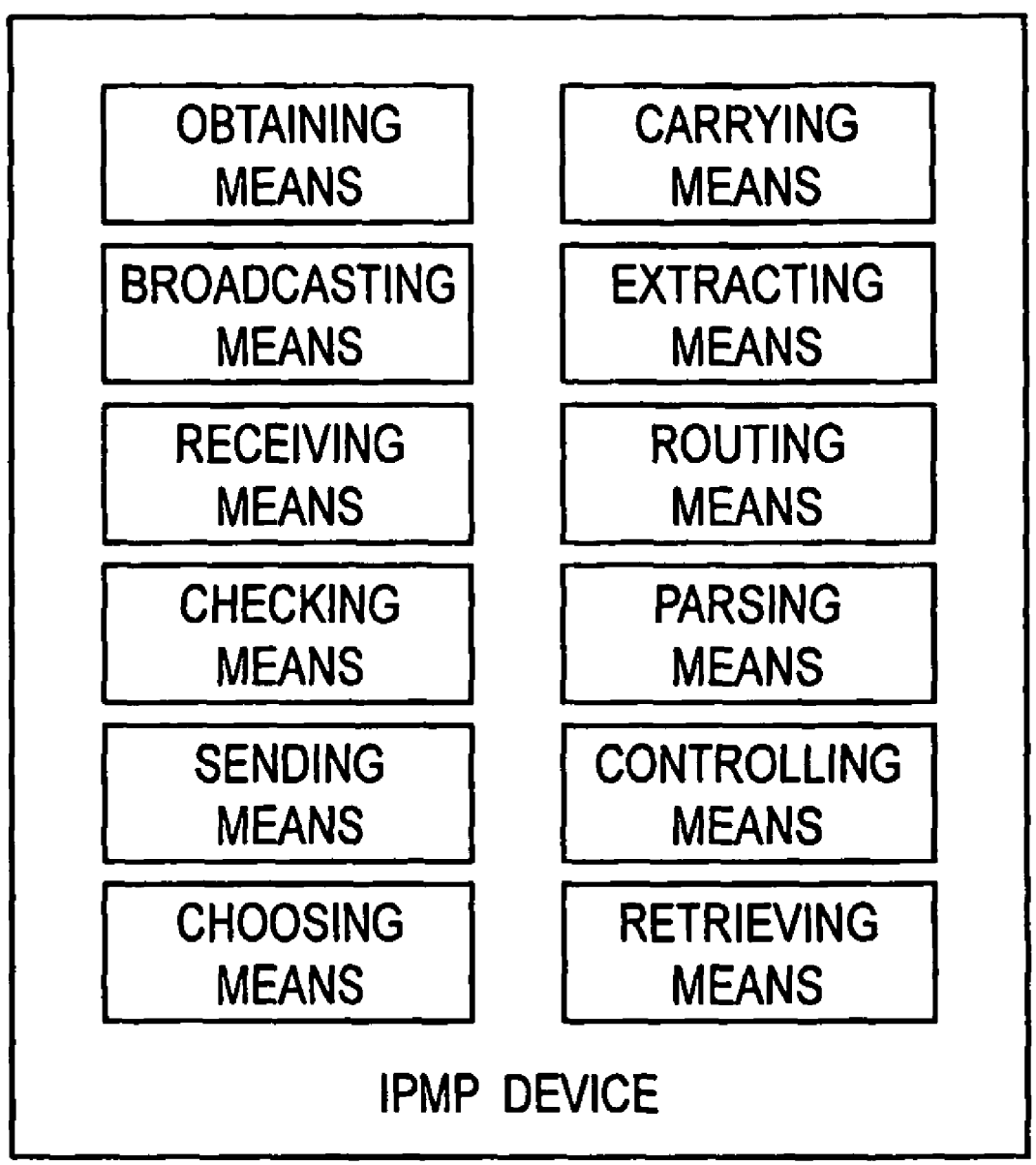
FIG. 4 shows a block diagram of the IPMP device of the present invention.

The invention can have the following structures viewed from various aspects. FIG. 4 shows a block diagram of the IPMP device of the present invention. According to the first, there is provided a method of messaging among distributed IPMP devices having a unique device ID to identify itself. The device ID is assigned during the manufacturing time, or at the time of purchasing. The method includes the steps of:

(a) obtaining a domain ID for each IPMP device to identify the network domain it resides in, wherein the network means a group of IPMP devices;

(b) broadcasting the IPMP device ID to neighboring IPMP devices, upon joining an IPMP devices' network domain; and (c) receiving an acknowledgement message including device ID of the neighboring IPMP devices, upon receiving the broadcasted device ID.

According to the second, there is provided a method according to the above. The method further includes the steps of:

(a) receiving a content request message from an IPMP Device which is requesting a content identified by a certain content ID;

(b) checking the domain ID sent in the request message, also checking the rights information associated with the requested content;

(c) sending back a reply message, either positive or negative; and (d) starting to send the content using content transfer messages, when the reply message is positive.

According to the third, there is provided a method according to the above. The method further includes the steps of:

(a) receiving a content request message from an IPMP Device which is requesting a content identified by a certain content ID;

(b) checking the domain ID sent in the request message, also checking the rights information associated with the requested content, (c) sending back a reply message, either positive or negative;

(d) choosing to do a mutual authentication with the IPMP Device, using mutual authentication messages defined in MPEG IPMP, to verify whether the IPMP Device is a trusted IPMP device; and (e) starting to send content using content transfer messages, wherein the content transfer message is carried as a payload as the secure message defined in MPEG IPMP to ensure its confidentiality, if the reply is positive and the mutual authentication is successful.

According to the fourth, there is provided a method according to the above. The method further includes the steps of:

(a) receiving an IPMP tool request message from an IPMP Device which is requesting an IPMP tool identified by a certain tool ID;

(b) checking the domain ID sent in the request message, also checking the availability of requested IPMP tool;

(c) sending back a reply message, either positive or negative; and (d) carrying the requested IPMP tool in the positive reply message, if the reply message is positive.

According to the fifth, there is provided a method according to the above. The method further includes the steps of:

(a) receiving an IPMP tool request message from an IPMP Device which is requesting an IPMP tool identified by a certain tool ID;

(b) checking the domain ID sent in the request message, also checking the availability of requested IPMP tool;

(c) sending back a reply message, either positive or negative;

(d) choosing to do a mutual authentication with the IPMP Device, using mutual authentication messages defined in MPEG IPMP, to verify whether the IPMP Device is a trusted IPMP device, if the reply is going to be positive; and (e) sending back the positive reply message containing the requested IPMP tool, where the reply message is carried as a payload as the secure message defined in MPEG IPMP to ensure its confidentiality, if the mutual authentication is successful.

According to the sixth, there is provided a method of processing rights information carried in a certain position in MPEG IPMP system. The rights information is constructed using a rights language, and is carried in a certain place in the content, and is sent to an IPMP terminal which has rights management tool based on the rights language. The method includes the following steps of:

(a) extracting the rights information from the place inside the content;

(b) routing the extracted rights information to the rights management tool;

(c) parsing the rights information, according to the rights language; and (d) controlling the content consumption with the management tool.

According to the seventh, there is provided a method of processing rights information carried in a certain position in MPEG IPMP system. The rights information is constructed using a rights language, and is carried in the place in the content, indicating which rights management tool should handle the rights language by specifying tool ID in the information associated with the rights information. The method includes the following steps of:

(a) extracting the rights information from the place inside the content;

(b) determining which rights management tool should handle this rights information by looking at the tool ID;

(c) retrieving the rights management tool if it is not present in the terminal;

(d) routing the rights information to the rights management tool;

(e) parsing the rights information according to the rights language; and (f) controlling the content consumption with the management tool.

According to the eighth, there is provided a method of processing rights information carried in a certain position in MPEG IPMP system. The rights information is carried in a Rights ES (Elementary Stream) associated with a content, and is constructed using a certain rights language, and is carried in the Rights ES in the content. The Rights ES is multiplexed together with other elementary streams, and sent to an MPEG IPMP terminal which has a rights management tool based on the rights language. The method includes the following steps of:

(a) extracting the rights information from the Rights ES inside the content;

(b) routing the rights information to the rights management tool; and (c) then parsing the rights information according to the rights language, and controlling the content consumption with the management tool.

According to the ninth, there is provided a method of processing rights information carried in a certain position in MPEG IPMP system. The rights information is carried in a Rights ES associated with a content, and is constructed using a rights language, and is carried in the place in the content, indicating which rights management tool should handle the rights language by specifying tool ID in the Decoder Specific Information associated with the Rights ESD (ES descriptor). The method includes the following steps of:

(a) extracting the rights information from the Rights ES inside the content;

(b) determining which rights management tool should handle this rights information by looking at the tool ID in the Decoder Specific Information;

(c) retrieving the rights management tool if it is not present in the terminal;

(d) routing the rights information to the rights management tool;

(e) parsing the rights information according to the rights language; and (f) controlling the content consumption.

Effective of Invention

A set of messages is defined for distributed IPMP devices. These messages include content transfer message, IPMP tool transfer messages, as well device ID broadcasting messages. Using these messages, distributed devices can use a standard set of messages to establish a network, and exchange content protected by IPMP in an inter-operable way.

Rights Elementary Stream (referred to as Rights ES) is defined in MPEG-4 system, to carry rights information. The Rights ES is also attached with information including whether the rights carried in the ES is proprietary or not, and/or what should be the rights management tool to handle this Rights ES. With that, terminal can be built in an inter-operable way, and retrieve rights from a standardized position.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

The invention claimed is:

1. A method of messaging among distributed IPMP devices having a unique device ID to identify itself, the unique device ID being assigned during a manufacturing time, or at a time of purchasing, the method comprising:
   obtaining a domain ID for each IPMP device to identify a network domain it resides in, wherein a network comprises a group of IPMP devices;
   broadcasting the unique device ID of an IPMP device to neighboring IPMP devices, upon joining a network domain of the IPMP device;
   receiving an acknowledgement message including the unique device ID of neighboring IPMP devices, upon receiving the broadcasted unique device ID; and
   transmitting a set of standard messages to exchange IPMP tools to ensure inter-operability among the group of IPMP devices.

2. A method according to claim 1, further comprising:
   receiving a content request message from an IPMP device which is requesting a content identified by a certain content ID;
   checking the domain ID sent in the request message, including checking rights information associated with the requested content;
   sending back one of a positive and negative reply message; and
   starting to send the content using content transfer messages, when the reply message is the positive reply message.

3. A method according to claim 1, further comprising:
   receiving a content request message from an IPMP device which is requesting a content identified by a certain content ID;
   checking the domain ID sent in the request message, including checking rights information associated with the requested content;
   sending back one of a positive and negative reply message;
   performing a mutual authentication with the IPMP device, using mutual authentication messages defined in MPEG IPMP, to verify whether the IPMP device is a trusted IPMP device; and
   sending content using content transfer messages, carried as a payload as a secure message defined in MPEG IPMP to ensure its confidentiality, when the reply is the positive reply message and the mutual authentication is successful.

4. A method according to claim 1, further comprising:
   receiving an IPMP tool request message from an IPMP device which is requesting an IPMP tool identified by a certain tool ID;
   checking the domain ID sent in the request message, including checking an availability of the requested IPMP tool;
   sending back one of a positive and negative reply message; and
   carrying the requested IPMP tool in the positive reply message, when the reply message is the positive reply message.

5. A method according to claim 1, further comprising:
   receiving an IPMP tool request message from an IPMP device which is requesting an IPMP tool identified by a certain tool ID;
   checking the domain ID sent in the request message, including checking an availability of the requested IPMP tool;
   sending back one of a positive and negative reply message;
   performing a mutual authentication with the IPMP device, using mutual authentication messages defined in MPEG IPMP, to verify whether the IPMP device is a trusted IPMP device, when the reply is the positive reply message; and
   sending back the positive reply message, containing the requested IPMP tool, carried as a payload as a secure message defined in MPEG IPMP to ensure its confidentiality, when the mutual authentication is successful.

* * * * *

UNITED STATES PATENT AND TRADEMARK OFFICE
CERTIFICATE OF CORRECTION

PATENT NO.         : 7,436,958 B2
APPLICATION NO.    : 10/502644
DATED              : October 14, 2008
INVENTOR(S)        : Ji Ming et al.

Page 1 of 1

It is certified that error appears in the above-identified patent and that said Letters Patent is hereby corrected as shown below:

On the Title Page, at Item (56), References Cited, the following foreign patent reference should be included:

--EP         1077398         02/2001--

Signed and Sealed this

Seventeenth Day of March, 2009

JOHN DOLL
*Acting Director of the United States Patent and Trademark Office*